Oct. 31, 1950     E. S. RUSSEY     2,527,965
TRANSMISSION CONTROL
Filed Sept. 25, 1946     2 Sheets-Sheet 1
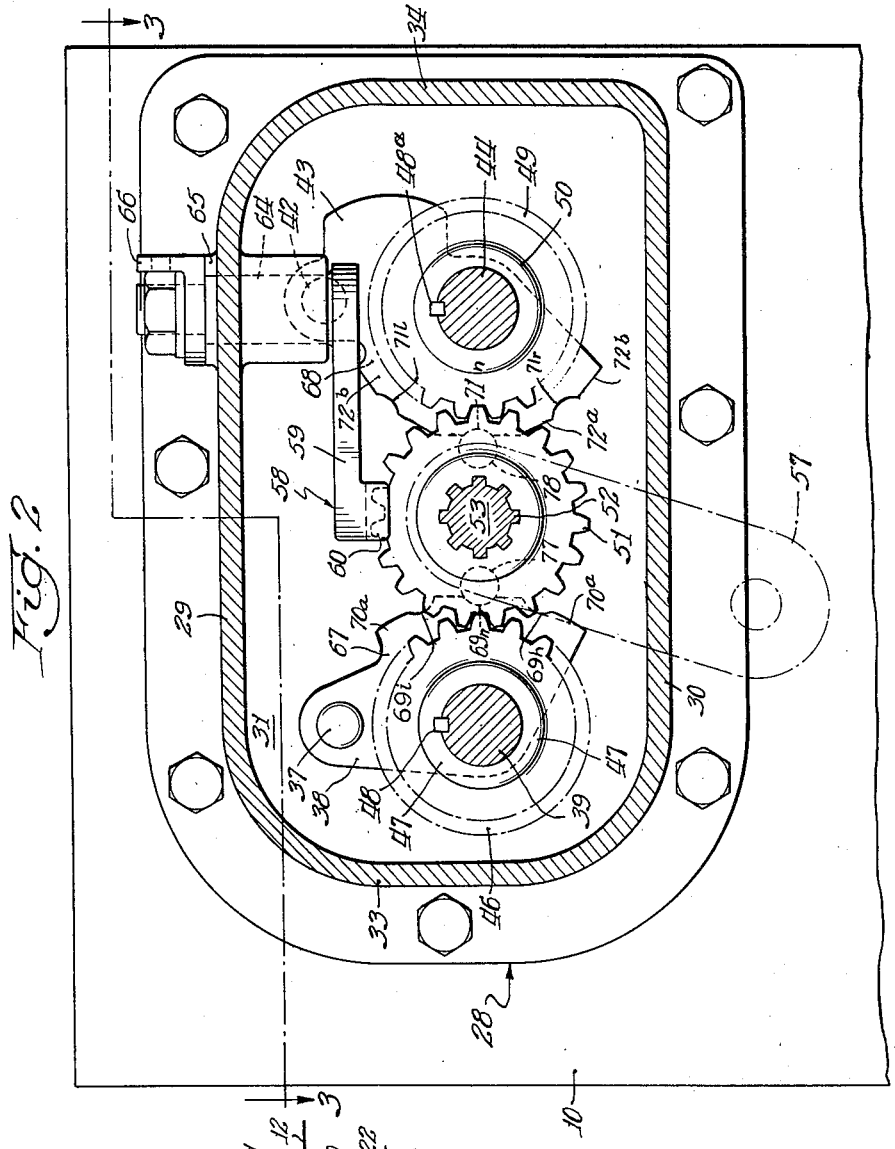
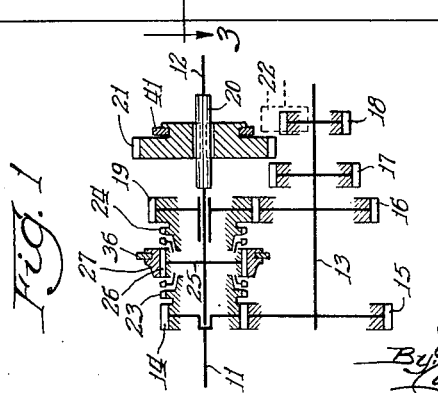
Inventor:
Edward S. Russey

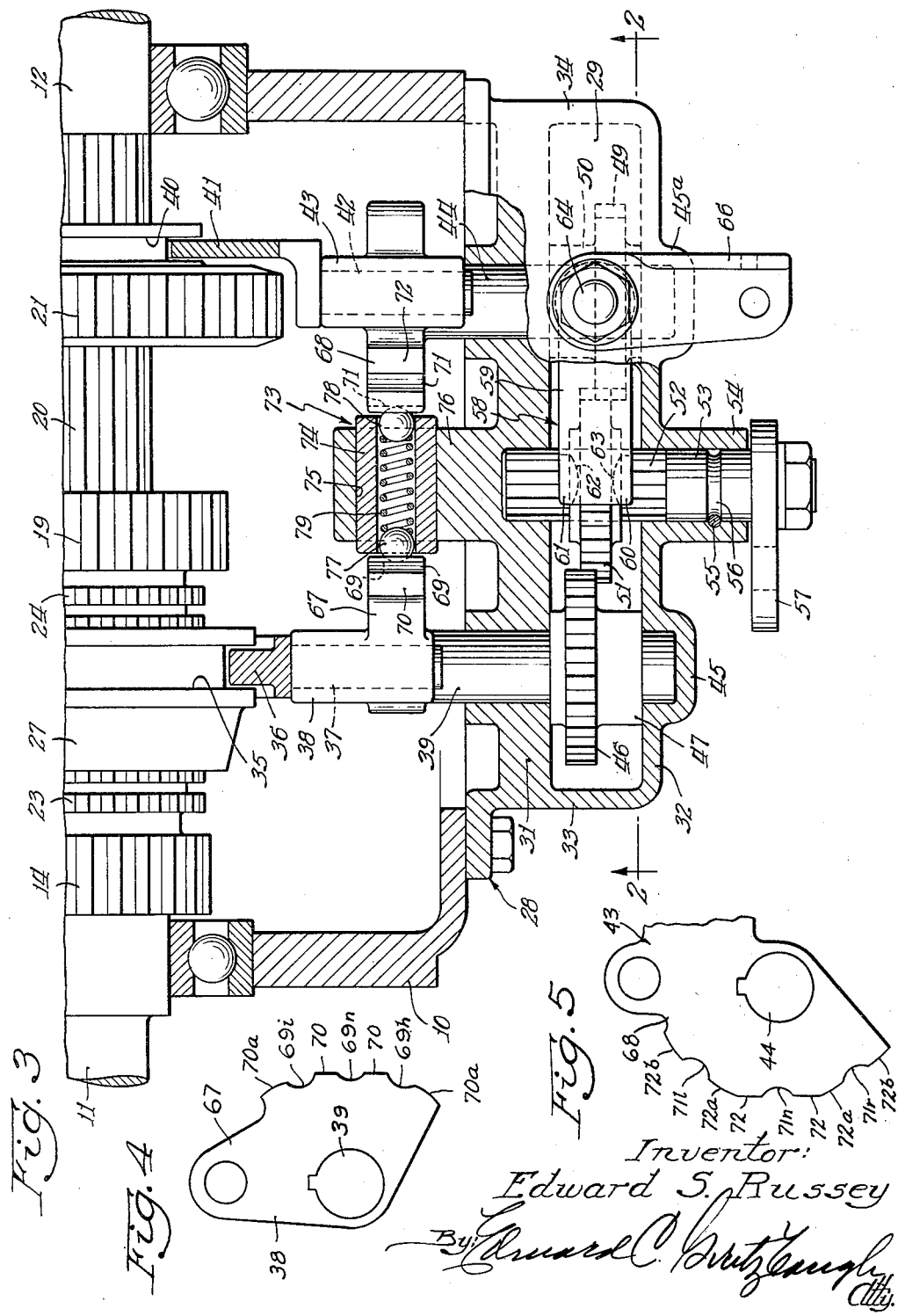

Patented Oct. 31, 1950

2,527,965

UNITED STATES PATENT OFFICE 2,527,965

TRANSMISSION CONTROL

Edward S. Russey, Muncie, Ind., assignor to Borg-Warner Corporation, Chicago, Ill., a corporation of Illinois Application September 25, 1946, Serial No. 699,274

2 Claims. (Cl. 74—473)

1

This invention relates to improvements in variable speed transmissions of the type employed in motor vehicles and more particularly of the type controlled from the steering column for shifting the gears and jaw clutch torque transmitting elements thereof.

The principal object of the invention is to provide an improved transmission control arrangement embodying novel selector and shifting mechanism for the transmission shift members operably connected to the torque transmitting elements which will be simple in construction, smooth in operation and economical to manufacture.

Another object of the invention is to provide control mechanism mounted on the transmission casing which permits selecting and shifting the transmission shift yokes in a positive manner and with expenditure of little effort on the part of the operator.

A further object of the invention is to provide a control mechanism for selecting and shifting the transmission shift yokes embodying a manually shiftable and rotatable toothed element adapted to selectively engage other toothed elements operatively connected to the shift yokes and to effect shifting movement of the selected yoke by its element for securing the desired speed ratio.

These and other objects and features of this invention will become apparent from the following description and accompanying drawings, in which:

Fig. 1 is a sectional diagrammatic view of a transmission assembly to which the present control mechanism is applicable;

Fig. 2 is a sectional view through the transmission taken along line 2—2 of Fig. 3 and having a preferred embodiment of the gear shift mechanism of this invention;

Fig. 3 is a sectional view through the transmission taken along line 3—3 of Fig. 2; and Figs. 4 and 5 are detail side elevational views of a pair of interlock cams employed in connection with present invention.

Referring now to the drawings for a detailed description of the invention, and particularly to Figs. 1 and 3, the transmission comprises a housing 10 for receiving and journaling an input shaft 11 and an output shaft 12 that are disposed with their axes in alignment and a countershaft generally indicated at 13. Rotatable with input shaft 11 is a gear 14 which meshes with a gear 15 mounted on countershaft 13. Rotatable with the countershaft 13 is a second speed gear 16,

2 a first or low speed gear 17 and a reverse gear 18. The gears 15, 16, 17 and 18 may be formed integrally with the countershaft 13 as cluster gears. In constant mesh with second speed gear 16 is a gear 19 which is loosely mounted on output shaft 12. The right-hand end (Figs. 1 and 3) of output shaft 12 is formed with splines 20 on which is slidably mounted a gear 21 for movement to the left to engage first speed gear 17, or to be moved to the position shown in Figs. 1 and 3 for neutral. Sliding gear 21 is also adapted to be moved to the right to engage an idler 22 which idler engages reverse gear 18 and provides a reverse drive in output shaft 12. Formed on the adjacent sides of the gears 14 and 19 are hub portions which are provided with external clutch teeth 23 and 24, respectively. Splined on the shaft 12 is a hub member 25 having teeth 26 which, in accordance with the usual practice, carry a shiftable positive jaw clutch sleeve 27 which is splined on the hub member at a location between the hub portion of the gears 14 and 19 and provided with internal clutch teeth with which the clutch teeth 23 and 24 respectively are adapted to be selectively meshed as is well-known in the art.

The gear trains establishable through the transmission, shown with the gears in neutral position, are as follows:

For low speed forward, the gear 21 is moved to the left to mesh with the gear 17, the gear train established being from gear 14 to gear 15, gear 17, gear 21 to the output shaft 12. For second speed, gear 21 is in a neutral position and sleeve 27 is moved to the right so as to engage teeth 24 of gear 19 with teeth 26 of the hub member 25, the gear train is then from gear 14 to gear 15, gear 16, gear 19 and sleeve 27 to the output shaft 12. For third speed or direct drive, the sleeve 27 is shifted to the left to engage teeth 23 of gear 14 with teeth 26 of the hub member 25 so as to provide a direct connection between the input shaft gear 14, the clutch sleeve 27 to the output shaft 12. For reverse drive, the sleeve 27 is in its neutral position and the gear 21 is moved to the right to engage idler 22, which establishes a gear train from gear 14 to gear 15, gear 18, idler 22 and gear 21 to the output shaft 12.

The portion of the control mechanism which is directly connected with the transmission mechanism housing is mounted on a cover 28 which is utilized for closing the side opening of the transmission housing. The cover 28 includes top and bottom walls 29 and 30 merging with spaced parallel walls 31 and 32 and end walls 33 and 34.

Referring now to Figs. 2 and 3 for details of the control mechanism for sliding gear 21 and sleeve 27, it will be observed that sleeve 27 is provided with an annular channel 35 in which is received a shift yoke 36. Said yoke 36 is secured to, or may be integral with, a shaft 37 which is rotatably mounted in a crank arm 38 of a rockshaft 39. Similarly sliding gear 21 is provided with a channel 40, preferably in its hub, in which is received a shift yoke 41 which may also be secured to or made integral with a shaft 42 which is rotatable in a crank arm 43 of a rockshaft 44. It may be noted from an inspection of Fig. 3 that each of the rockshafts 39 and 44 are journalled centrally thereof in the wall 31 of the cover 28 and have their ends journalled in bearing bosses 45 and 45a formed in the wall 32 of the cover 28.

Mounted on the rockshaft 39 between the walls 31 and 32 of the cover 28 is a gear 46 having a hub portion 47 secured to the shaft 39 by a key 48 and held against movement axially of the shaft 39 by the walls 31 and 32. Similarly, the rockshaft 44 has mounted thereon a gear 49 having a hub portion 50 which is secured to the shaft by a key 48a and held against movement axially of the shaft 44 by the walls 31 and 32 of the cover 28.

As shown in Fig. 3, the gears 46 and 49 are mounted on the shafts 39 and 44, respectively, so that they are disposed in parallel planes for a purpose hereinafter described. Selective rotation of the gears 46 and 49 and thereby the shift yokes 36 and 41 is accomplished by means of a gear 51 slidably mounted on splines 52 on a shaft 53 having its opposite ends journaled respectively in the wall 31 of the cover 28 and in a bearing boss 54 in the wall 32 of the cover. The shaft 53 is held against endwise movement by a key 55 mounted in the boss 54 and engaged in an annular groove 56 in the shaft. To the outer end of the shaft 52 is secured an operating lever 57 which is connected by linkage (not shown) to the steering post control mechanism.

It will be apparent from an inspection of Fig. 3 that the gear 51 on the shaft 53 is shiftable axially thereof to mesh the teeth of the gear with either the teeth of the gear 46 or the teeth of the gear 49 due to the disposition of the gears 46 and 47 in parallel planes and the range of movement of the gear 51 axially of the shaft 53 afforded by the splines 52 thereof extending between the walls 31 and 32. It may also be noted that the width of the gear 51 is such that the gear may be selectively shifted into engagement with either one of the gears 46 and 49 without having engagement with the other of said last-mentioned gears.

For the purpose of shifting the gear 51 to and fro along the shaft 53 into engagement with either the gear 46 or the gear 49, a crank generally designated 58 is provided having an arm 59 formed at its outer extremity with downwardly extending lugs 60 and 61 having opposed arcuate surfaces 62 and 63 receiving the gear 51 therebetween. The crank arm 58 has an arm or shaft 64 extending upwardly from its arm 59 which is journaled in a vertical boss 65 in the top wall 29 of the cover 28. The upper end of the shaft 62 is secured to an operating lever 66 which is connected by linkage (not shown) to the steering post control mechanism. Thus by swinging the operating lever 66 to and fro, the crank 58 shifts the selector gear 51 longitudinally of the shaft 53 into meshing engagement with one or the other of the gears 46 or 49 operatively connected to the shift yokes 36 or 41.

In order to lock one of the shift yokes against accidental movement while the other is being shifted, a suitable interlock is provided between the two yokes 36 and 41 and comprising sector portions 67 and 68 on the respective crank arms 38 and 43 in which the yokes are rotatably mounted.

The periphery of the sector 67 (Fig. 4) of the crank arm 38 is formed with a series of three notches 69n, 69h, and 69i, the suffixes representing neutral, high speed and intermediate speed respectively. The notch 69n is separated from the notches 69h and 69i by relatively high regions 70 which are in the form of flat and aligned surfaces. The notches 69h and 69i are bounded on the sides thereof remote from the notch 69n by relatively high regions 70a which may be curved or arcuate and their overall height, i. e. the distance from the axis of the shaft 39, is greater than the height or the distance from the axis of the shaft 39 of the aligned flat regions 70. Similarly, the periphery of the sector 68 (Fig. 5) of the crank arm 43 is provided with a series of three notches 71n, 71l and 71r, representing neutral, low and reverse speeds. Because of the greater leverage offered by the crank arm 43, the notch 71n, 71l and 71r are comparatively widely separated from one another and the notch 71n is bounded on opposite sides thereof by aligned high regions 72 which are substantially flat and which merge into still higher arcuate regions 72a. The outer sides of the notches 71l and 71r on the sides remote from the notch 72n are bounded by arcuate regions 72b of greater height than the height of the aligned, flat high region 72.

The various notches of the two sectors 67 and 68 cooperate with a combined interlock and yieldable positioning poppet device 73 to prevent shifting of either sector 67 or 68 from its neutral positoin while the other sector is in the process of being shifted or when a shift thereof has been completed from the neutral position thereof.

The interlocking device 73 comprises a sleeve 74 (Fig. 3) which is slidably mounted in a bore 75 formed in a boss 76 provided on the wall 31 of the cover 28 between the crank arms 38 and 43. A pair of balls 77 and 78 are positioned within the sleeve 74 in the end regions thereof. The ball 77 is selectively engageable in the notches 69n, 69i or 69h in the sector 67 and the ball 78 is selectively engageable in the notches 71n, 71l and 71r. Both balls are yieldingly urged outwardly away from each other by means of a coil spring 79.

During movement of one of the crank arms 38 or 43 from its neutral position, for example, the crank arm 38, one or the other of the flat surfaces 70 of the sector 67 will engage and, by a camming action, move the adjacent end of the sleeve 74 toward the sector 68 with the result that the other or remote end of the sleeve will abut against the aligned, flat surfaces 72, the ball 78 being urged and nested between these surfaces and into the notch 71n, whereby the crank arm 43 will be held against movement away from its neutral position. After a shift has been made by movement of the crank arms 38, and the ball 77 occupies a position within either notch 69i or 69h, the relatively high portion 70a of the sector 67 will bear against the sleeve 74 and continue to hold the other end of the sleeve against the aligned, flat surfaces 72 and thus prevent shifting of the crank arm 43.

A similar situation exists when the crank arm 43 moves in either direction from its neutral position. Initial movement of this arm will cause one or the other of the aligned, flat surfaces 72 to bear against an end of the sleeve 74 and force the other end of the sleeve against the aligned, flat surfaces 70, to thus lock the crank arm 38 in its neutral position. When the crank arm 43 has moved from its neutral position to either of its gear-engaging positions wherein the ball 78 occupies a position within either of the recesses 71*l* or 71*r*, one or the other of the two aligned, flat surfaces 72 will engage an edge of the sleeve 74 and urge the sleeve toward the crank arm 38 so that the other end of the sleeve engages the aligned, flat surfaces 70, thereby locking the crank arm 38 in its neutral position. After the crank arm 43 has been moved to either of its limiting positions with the ball 78 disposed in either the notch 71*l* or 71*r*, as the case may be, the relatively high surfaces 72*a* and 72*b* on either side of the notch bear against the end of the sleeve 74 and retain the latter in its locking position wherein an end thereof bears against the aligned, flat surfaces 70 of the crank arm 38 and prevents shifting of the latter out of its neutral position.

From the above description it will be seen that it is impossible to shift either of the crank arms 38 or 43 when the other crank arm is in the process of being shifted or when it has been shifted away from its neutral position. Additionally the interlock arrangement renders it impossible to shift both of the crank arms out of their neutrol positions simultaneously.

In describing the operation of the control mechanism, let it be assumed that the motor vehicle is at rest with the motor running and the transmission and control mechanism therefor is positioned in the neutral position as shown in the figures of the drawings. To obtain low forward, the selecting lever 66 of the crank 58 is rotated in a counterclockwise direction (Fig. 3) to cause the arm 59 thereof to shift the gear 51 axially of the shaft 53 toward and into engagement with the gear 49. The shift lever 57 may then be rotated in a clockwise direction (Fig. 2) to effect rotation of the gear 51 and thereby the gear 49 and the crank arm 43 to move the shift yoke connected thereto to slide the gear 21 along the output shaft 12 and into engagement with the gear 17 to establish low forward speed. The various gears and the other parts of the control mechanism are then returned to their neutral positon as shown in the drawings to condition the transmission for second speed. To establish second speed, the selecting lever 66 is rotated in a clockwise direction (Fig. 3) to effect movement of the selector gear 51 along the shaft 53 and into mesh with the gear 46, the gears 51 and 46 then being rotated by counterclockwise movement of the shifting lever 57 (Fig. 2) to rotate the crank arm 39 and thereby move the associated shift yoke 36 and sliding clutch sleeve 27 to effect toothed engagement of the latter with the gear 19, which is in engagement with the second speed gear 16. Thereafter, third speed or direct drive is readily established by merely rotating the shift lever 57 in a reverse or clockwise direction (Fig. 2) which will rotate the gear 51 and thereby effect rotation of the gear 46 and its associated crank arm 38 in a counterclockwise direction to shift the yoke 36 and move the clutch sleeve 27 into toothed engagement with the teeth 23 of the gear 14, a direct connection thus being established between the input and output shafts 11 and 12. To obtain reverse drive, the shift lever 57 and selector lever 66 are returned to their neutral positions shown in the drawings and the lever 66 is then rotated in a counterclockwise direction (Fig. 3) to engage gear 51 with gear 49. Shift lever 57 is then rotated in a counterclockwise direction (Fig. 2) to cause gear 51 to rotate gear 49 clockwise for shifting yoke 41 to the right thereby sliding gear 21 into mesh with the reverse idler gear 22 for establishing reverse drive.

It will thus be seen that I have provided a simple shift control mechanism for a transmission and which utilizes a single selecting and shifting gear adapted to coact with gears respectively associated with shift yokes and operative to establish the different speed ratios, the entire control mechanism for the transmission being mounted on the side cover of the trnasmission housing.

Various changes will be apparent to those skilled in the art without departing from the spirit and scope of the invention and it is not intended to limit the invention in its broader aspects to the details shown and described, the scope of the invention being set forth in the appended claims.

I claim:

1. In a transmission having a pair of shiftable drive control elements movable from neutral positions to drive completing positions, a pair of operating members mounted for independent oscillation about parallel axes, means operatively connecting one of said control elements with one of said operating members and the other control element with the other operating member whereby said elements assume positions corresponding to the positions of the respective members, a rock shaft oscillatable about an axis parallel to the axes of said operating members, toothed means mounted on each of said operating members and toothed means on said rock shaft movable axially to engage either of said first-named toothed means whereby subsequent rotation of the rock shaft causes oscillation of one or the other of said operating members and movement of its control element, and an interlock cooperable with said operating members for preventing the simultaneous movement out of neutral position of both of said members, the toothed means of said operating members being located so adjacent each other that the toothed means on said rock shaft is always in engagement with at least one of said first-named toothed means and, due to said interlock, said rock shaft and the toothed means thereon cannot be oscillated when the toothed means on the rock shaft is in mesh with both of said first-named toothed means.

2. In a transmision having a plurality of torque transmitting members each of which is capable of being shifted from a medial position in opposite direction to one of two extreme positions, a casing for said elements, a pair of cranks for effecting the shift of said members and journaled in said casing for rotation on parallel axes, a toothed member on each crank and rotatable therewith, a shifting member journaled in said casing between said cranks and rockable on an axis parallel to the axes of said cranks, a toothed selecting member on said shifting member rotatable therewith and having slidable movement axially thereof into meshing engagement with one or the other of said first-mentioned toothed members, means for selectively sliding said selecting member, means for rotating said shifting member, and interlock means mounted on said casing between said cranks and engageable therewith for preventing movement of either crank from its medial position when the other crank has been shifted from its medial position and for preventing simultaneous shifting of both cranks from any position thereof, said toothed selecting member on said shifting member having a limited axial movement whereby it is always in engagement with at least one of the toothed members on said cranks and cooperating with said interlock means so that when it is in engagement with both of the toothed members on said cranks it is held by the interlock means from rotation in either direction.

EDWARD S. RUSSEY.

REFERENCES CITED

The following references are of record in the file of this patent:

UNITED STATES PATENTS

| Number | Name | Date |
| --- | --- | --- |
| 1,170,830 | LeBlond | Feb. 8, 1916 |
| 1,635,484 | Kesling | July 12, 1927 |
| 2,202,950 | Girardi | June 4, 1940 |
| 2,323,516 | Cipullo | July 6, 1943 |
| 2,350,506 | Haight | June 6, 1944 |
| 2,438,691 | Armantrout | Mar. 30, 1948 |

FOREIGN PATENTS

| Number | Country | Date |
| --- | --- | --- |
| 254,848 | Great Britain | July 15, 1926 |
| 636,725 | Germany | Oct. 14, 1936 |